Jan. 22, 1929.

L. B. CONANT 1,699,953

PROCESS OF MAKING COMBINATION HEELS

Filed Oct. 4, 1926

Inventor
Leon B. Conant;
By
A. B. Upham,
Attorney.

Patented Jan. 22, 1929.

1,699,953

UNITED STATES PATENT OFFICE.

LEON B. CONANT, OF CAMBRIDGE, MASSACHUSETTS, ASSIGNOR TO STANDARD PATENT PROCESS CORPORATION, A CORPORATION OF MASSACHUSETTS.

PROCESS OF MAKING COMBINATION HEELS.

Application filed October 4, 1926. Serial No. 139,345.

This invention relates to footwear, and especially to heels composed of a fibrous base and a rubber tread vulcanized thereto; and it has for its object the effecting of an improved process for preparing the bases for the vulcanization whereby they shall not be injured by the high temperature required in the process, and whereby the mold is adapted to make important contribution to efficient manufacture, and also whereby the sequence of operation in handling and loading the mold reflect maximum service at minimum cost.

Accordingly, having dried the leather base, preferably at a moderate temperature, and then preheating by introducing them to a temperature substantially equal to that employed in the subsequent vulcanization, they are then placed as soon as may be upon the plunger on the center plate of the mold; thus the heat of the back plate, which is equal to the vulcanizing temperature, guarantees the safety of the leather, since it absorbs the heat radiation during the loading.

Figure 1:
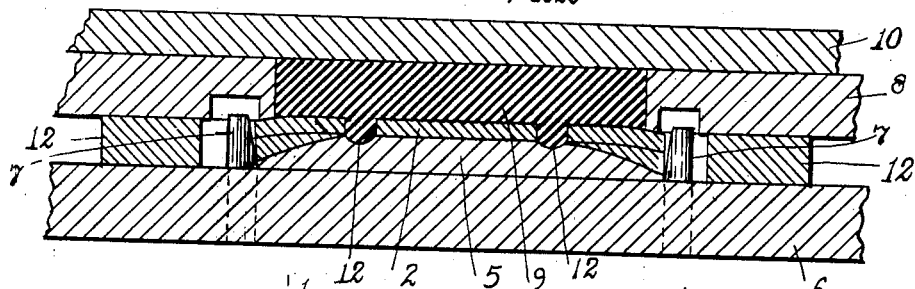
Figure 2:
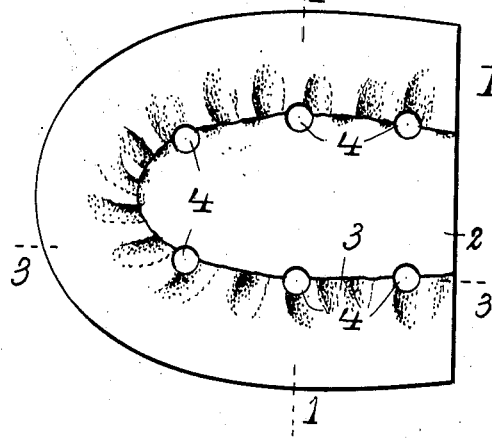
Figure 3:
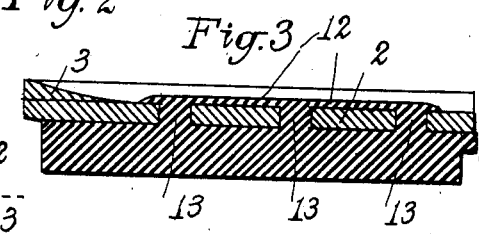
Figure 4:
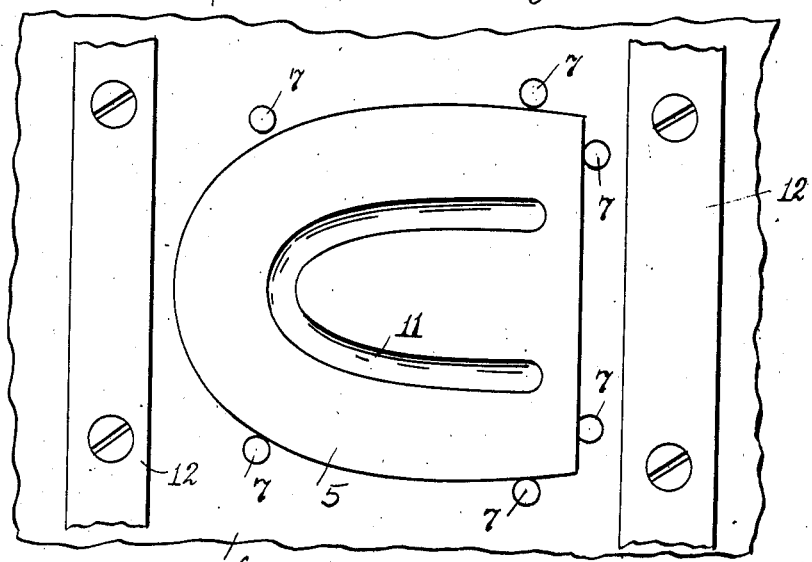
Figure 5:
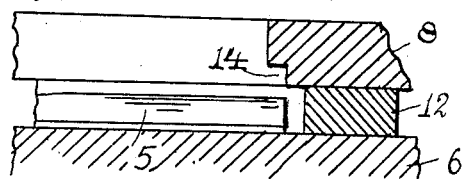

In the drawings forming part of this specification, Fig. 1 is a cross section of a combination heel on the line 1—1 in Fig. 2, and of the mold in which it is vulcanized. Fig. 2 is a plan view of the heel base. Fig. 3 is a longitudinal section of the heel on the line 3—3 in Fig. 2. Fig. 4 is a plan view of the back plate of the mold. Fig. 5 is a sectional detail view of parts of the mold.

The combination heels to which my process is applicable are those consisting of a fiber base and a rubber tread vulcanized thereto, the base being preferably composed of one or two leather lifts having a rand attached thereto, and perforated to permit the rubber to penetrate the same for the more complete attachment thereto of the tread.

The heel base illustrated in the drawings consists of but a single lift 2 having a rand 3, and a number of holes 4. The latter are preferably punched along the inner edge of the rand, as shown in Fig. 2.

My improved process consists, first, in thoroughly depriving the heel base of all moisture, in any suitable manner and at a moderate temperature; second, heating it to approximately the same heat as that of the subsequent vulcanization; third, placing it upon the hot plunger 5 of the back plate 6 to ensure that it shall be equally heated; depositing the centre plate 8 over it; putting the biscuit of rubber 9 in the cavity of the centre plate; and finally placing the face plate 10 thereupon, and introducing the whole into the vulcanizing press.

As a further improvement in this process, a recess 14, as shown in Fig. 5, is formed at the breast of the cavity of the center plate to permit the rubber overflow to occur at the breast of the heel, and not at its curved periphery; thereby eliminating any trimming anywhere except at the breast of the base, which has to be trimmed anyway. Hence in this process, the flow of the rubber during the vulcanizing compression is largely toward the breast of the heel.

It is customary in the manufacture of heel bases of the kind illustrated, to form the rand from one or more skived strips of leather, and, after forcing it into the required horseshoe shape and pasting it to the lift, to apply an enormous pressure sufficient to flatten out all the wrinkles produced in the rand by its bending. I have found that such preliminary compression may be dispensed with since upon the introduction of an unpressed heel base into the mold, the rubber exuded through the holes 4 will be forced into the wrinkles of the rand and into the slight shoulder along the inner edge of the rand, by the pressure usually applied in vulcanization, and thereby give to the heel surface a smothness that is entirely satisfactory in appearance, and at the same time will aid the binding of the base and tread together.

In addition to this, I prefer to form a ridge of the rubber, as 12, upon the surface of the base, which terminally ties the rubber plugs 13 filling the holes 4. To do this, the plunger 5 is recessed or grooved, as at 11 underlying the holes 4 of the heel base, as indicated in Figs. 1 and 4, into which the rubber passes.

As shown in Figs. 1 and 4, the heel bases are positioned upon the plunger 5 by means of pins 7 projecting from the back plate 6; and the back plate and center plate are limited in their approach by strips or blocks 12.

What I claim as my invention is:

1. The process of uniting by heat and pressure a rubber tread to a perforate fibrous base which consists in forcing rubber composition integral with the tread through perforations spaced in said base into recesses in the mold whereby the area of the base adjacent the top of each perforation is capped with rubber composition.

2. The process of uniting by vulcanization a rubber tread to a fibrous base having perforations which consists in placing said base in a mold provided with recesses co-operating with said perforations, placing a biscuit of rubber composition therewith and introducing the whole to heat and pressure whereby the rubber composition is forced thru said perforations into said recesses to provide integral anchoring studs formed with caps seated above said base.

3. The process of vulcanizing a ruber tread to a fibrous base having a top-face and a bottom-face and perforations therein connecting said faces, the said perforations being spaced to co-operate with recesses in the mold whereby upon the application of heat and pressure portions of the rubber composition are forced from below said bottom-face thru said perforations and upon said top-face to form integral anchoring studs whose caps are seated on said top-face of said base.

In testimony that I claim the foregoing invention, I have hereunto set my hand this 30th day of September, 1926.

LEON B. CONANT.